United States Patent [19]

Armstrong

[11] 4,335,464
[45] Jun. 15, 1982

[54] DUAL MULTIPOINT DATA TRANSMISSION SYSTEM MODEM

[75] Inventor: Thomas R. Armstrong, Largo; Gordon Bremer, Clearwater; William Betts, Madeira Beach, all of Fla.

[73] Assignee: Paradyne Corporation, Largo, Fla.

[21] Appl. No.: 115,118

[22] Filed: Jan. 24, 1980

[51] Int. Cl.³ .............................................. H04J 1/18
[52] U.S. Cl. .................................... 375/43; 370/69.1; 370/71
[58] Field of Search ................... 179/2 DP, 84, 1 GS; 332/45; 370/37, 45, 69, 71, 72; 375/38, 43, 61, 79; 455/46, 47, 59

[56] References Cited

U.S. PATENT DOCUMENTS

| | | | |
|---|---|---|---|
| 1,717,064 | 6/1929 | Rettenmeyer | 179/1 GS |
| 2,407,684 | 9/1946 | Roberts | 370/45 |
| 3,202,762 | 8/1965 | Aaron et al. | 370/69 |
| 3,701,852 | 10/1972 | Sluijter et al. | 375/45 |

*Primary Examiner*—Benedict V. Safourek
*Attorney, Agent, or Firm*—Kane, Dalsimer, Kane, Sullivan and Kurucz

[57] ABSTRACT

A modem is provided which allows two independent sets of multipoint users to share a common communication media such as a telephone channel. At each site there is provided a modem which transmits and receives two independent frequency division multiplexed data streams simultaneously over a common telephone channel. Each data stream is encoded into an eight phase PSK or QAM signal. One data stream signal is transmitted in a low frequency range and the second is transmitted in a high frequency range. Means are provided at each site to combine the data streams for transmission over a single communication line and to separate the received combined signal from the communication line.

2 Claims, 7 Drawing Figures

Dual 2400 BPS Transmitter

Multipoint Network Structure

Dual Multipoint Network

Sharing of Communication
Media Bandwidth by Frequency Division Multiplexing

Two Colocated Multipoint Network

Dual 2400 BPS Modem Structure

Dual 2400 BPS Transmitter

Dual 2400 BPS Receiver

DUAL MULTIPOINT DATA TRANSMISSION SYSTEM MODEM

BACKGROUND OF THE INVENTION

The present invention relates to a high speed modem used for data transmission and in particular to a modem which allows two independent multipoint networks to share the same communications lines or media.

Multiplexing in frequency or in-time permits multiple users to share a common communication media simultaneously. In *Communication System Engineering Handbook* by D. H. Hamsher, McGraw-Hill, 1967, various data transmission multiplexing techniques are discussed in detail. These techniques assume that the multiple users and hence the multiplexing equipment are connected in a point-to-point fashion by the communication media.

Recently many communication systems have been developed which employ a multi-point or multi-drop configuration. In these systems, many users share a common party line to a central site. While the central site may broadcast to all users, at any one time only one user may transmit to the central site. If two users transmit to the central site simultaneously, they mutually interefer and both transmissions are lost. The protocol employed to insure proper user response is referred to as polled. A typical multi-point communication system is depicted in FIG. 1 in which the communications line is a telephone line. The operation of the depicted multi-point or, as it is sometimes called, multi-drop system is discussed in detail in *Systems Analysis for Data Transmission* by James Martin, Prentice-Hall, Inc., 1972. It suffices for the present discussion to note that multiple terminals and associated modems (1, 2, and 3, for example) are connected through a telephone party line to a master modem which in turn is connected to the system front end processor.

With the advent of large, complex data communication systems, many users have found a need for two independent multi-point communication systems which serve, or are located at common sites. Previously, this would require twice the hardware and components of a one multipoint system. That is, a dual system requires two sets of communication lines and two modems at each site, one for each of the terminals. FIG. 2 illustrates such a dual system in which it should be noted that at each location 1, 2 and 3 there is an "A" modem and a "B" modem and a connection with an "A" and a "B" party line.

The obvious disadvantage of the dual system of FIG. 2 is that it requires double the outlay for equipment as would be required for the system of FIG. 1. In addition, double the rental fees must be paid for the two lines required as compared to the single line of FIG. 1.

In view of the above, it is the principal object of the present invention to provide a multi-point system which permits the virtual independent operation of two multi-point communication systems through a single modem at each location.

A further object of this invention is to provide a transmitter/receiver structure which allows virtual independent operation of each of the multi-point systems over the same communication line.

Other objects and advantages will be self-evident from the description of the preferred embodiment of the invention.

SUMMARY OF THE INVENTION

The above and other beneficial objects and advantages are attained in accordance with the present invention by providing dual multipoint data transmission networks sharing common sites wherein at each site there is provided a modem which transmits and receives two independent frequency division multiplexed 2400 BPS data streams simultaneously over a common 3 KHz telephone channel. Each data stream is encoded into an eight phase PSK or QAM signal. One data stream signal is transmitted in the frequency range of 500 to 1600 Hz and the second is transmitted in the frequency range of 1800 to 2900 Hz. Means are also provided at each site to combine the data streams for transmission over a single communication line and to separate the received combined signal from the communication line.

DESCRIPTION OF THE PREFERRED EMBODIMENTS

Figure 1:
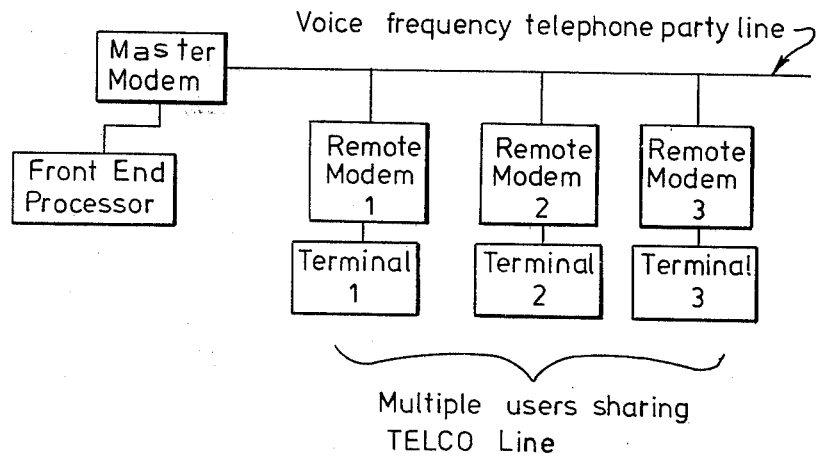
FIG. 1 is a block diagram representation of a typical prior art multi-point data communications system.
Figure 3:
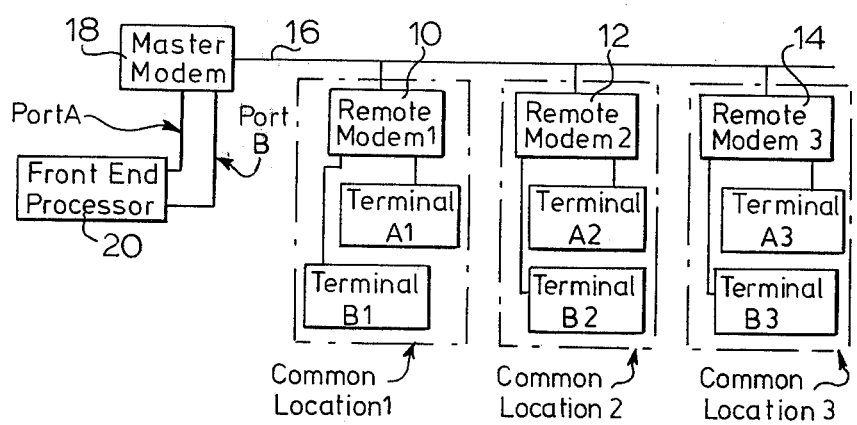
FIG. 3 is a block diagram representation of the present invention providing two independent data communications systems serving common sites.

Reference is now made to the drawings and to FIG. 3 in particular wherein a dual multipoint data transmission system serving common sites 1, 2 and 3 is depicted. It should be noted at the outset that while three common sites are depicted, the present invention is by no means limited to any particular number of sites. At each of the sites there is an A terminal and a B terminal with the A terminals A1, A2 and A3 making up the "A" network and the B terminals B1, B2 and B3 making up the B network. At each of the sites 1, 2 and 3 there is also located a modem connected to both terminals in a manner to the described. Thus, at site 1 modem 10 is connected to terminals A1 and B1; at site 2 modem 12 is connected to terminals A2 and B2; and at site 3 modem 14 is connected to terminals A3 and B3. Each of modems 10, 12 and 14 is connected to a common communication line such as a voice grade telephone party line 16. The telephone line 16 connects the remote sites with a master modem 18 which in turn is connected with a central front end processor 20 usually located at the master site.

Figure 4:
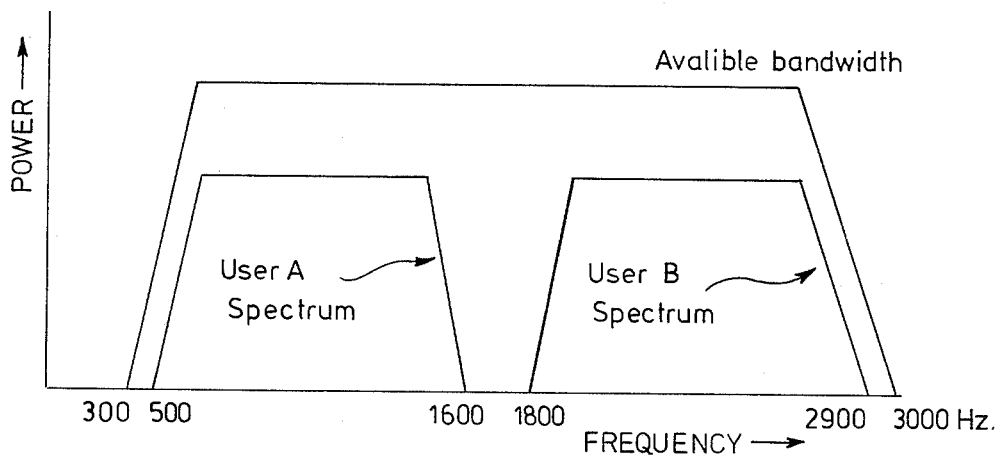
FIG. 4 is a diagram depicting the manner of sharing the available bandwidth in accordance with the present invention.
Figure 2:
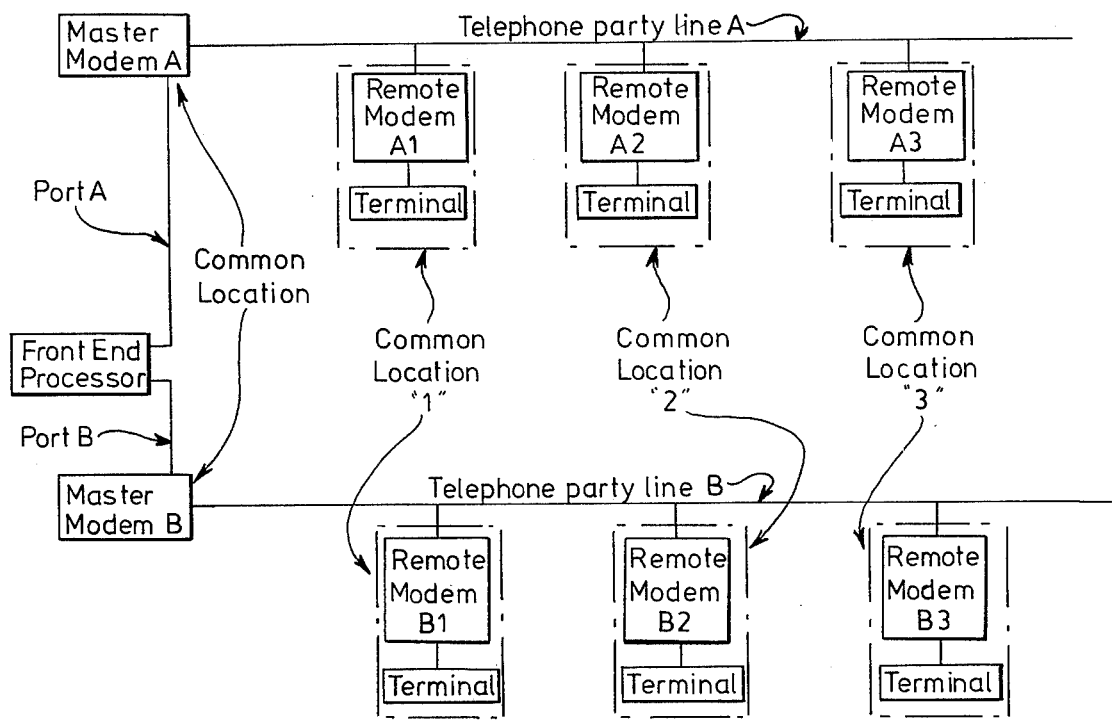
FIG. 2 is a block diagram representation of the prior art manner for providing two independent data communications systems serving common sites.

In accordance with the present invention, as illustrated in FIG. 4, two users may share a common communication media such a telephone line 16, by the known technique of frequency division multiplexing. In telephone systems the usual available bandwidth is from 300 to 3000 Hz. Accordingly, the A network is allocated a bandwidth from approximately 500 to 1600 Hz and the B network is allocated the bandwidth from approximately 1800 to 2900 Hz. A guard band of 200 Hz separates the two networks.

In a Nyquist bandwidth of 800 Hz a symbol rate of 800 symbols per second may be achieved by the well known technique of QAM as is discussed in U.S. Pat. No. 3,887,768. By encoding 3 bits per symbol or equivalently selecting one of eight possible phases or points in the signal space, a data rate of 3 times 800 symbols per second or 2400 BPS may be achieved. In practice, the 800 Hz Nyquist bandwidth requires an effective bandwidth of approximately 1100 Hz due to practical restrictions on spectral filtering. Hence, in a nominal 300 to 3000 Hz bandwidth two independent 2400 BPS data streams may be transmitted.

Figure 5:
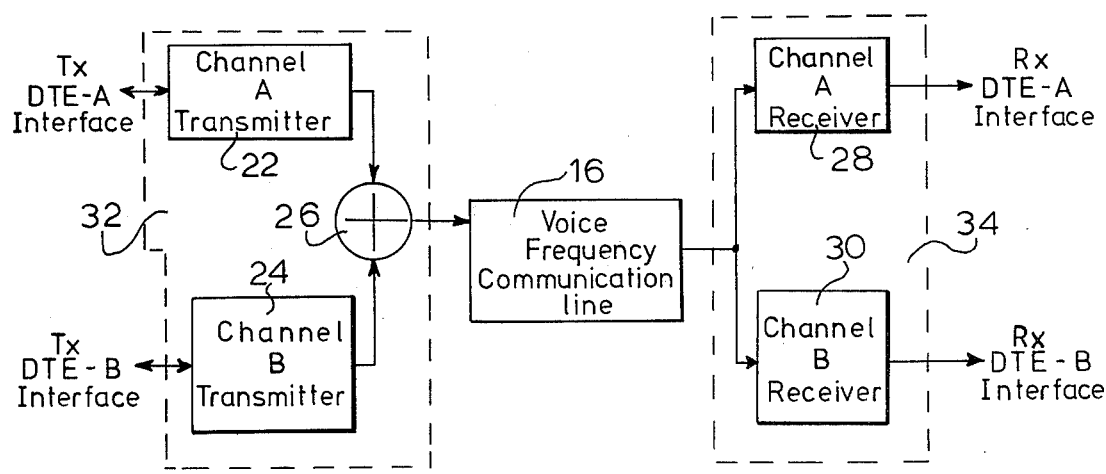
FIG. 5 is a block diagram depicting the construction of the modems of the present invention.

The dual 2400 BPS transmitter and receiver structure employed in the modems of the present invention is illustrated in FIG. 5. At each site modem 10, 12, 14 and the master modem 18 there is provided a dual transmitter structure 32 and a dual receiver structure 34. Thus, two independent transmitters, 22 and 24 for the A and B networks respectively are employed in transmitter 32. The A transmitter 22 employs a carrier frequency of 1050 Hz while the B transmitters 24 employs a carrier frequency of 2350 Hz. Each transmitter 22 and 24 utilizes the respective bandwidths mentioned above (i.e., 500 Hz–1600 Hz for A transmitter 22 and 1800 Hz–2900 Hz for B transmitter 24). The two transmitter outputs are added through adder 26 before being outputted to the telephone line 16 or other transmission media.

The dual receiver 34 is similarly composed of two separate receivers, the first receiver 28 for the A network employing a 1050 Hz carrier and the second receiver 30 for the B network employing a 2350 Hz carrier. Thus data supplied to the A transmitter 22 is outputted by an A receiver 28 and vice versa. Similarly data supplied to the B transmitter 24 is outputted by a B receiver 30 and vice versa. Data traffic through the A and B networks are thus mutually independent.

Figure 6:
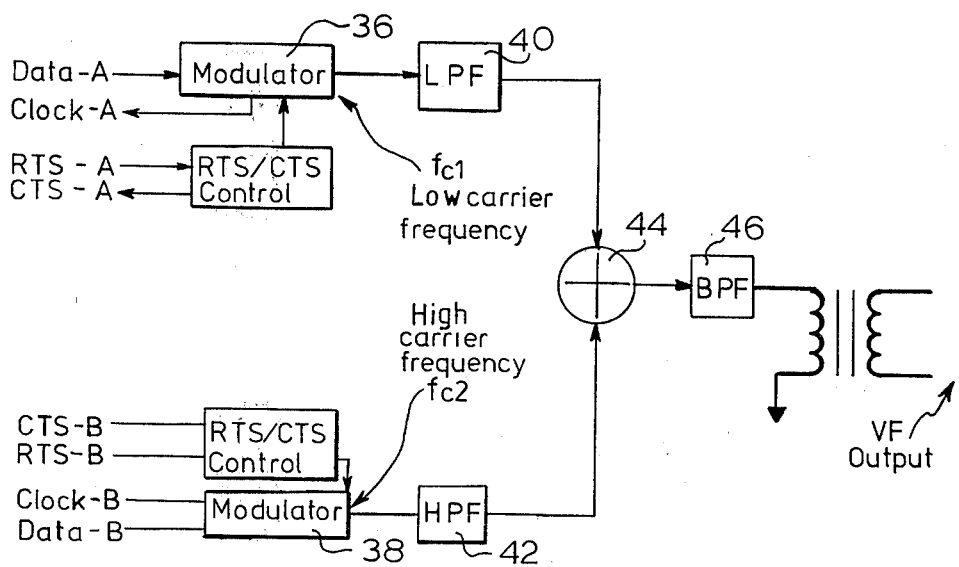
FIG. 6 is a block diagram of the modem transmitter facility.

A specific implementation of the dual 2400 BPS transmitter 32 is shown in FIG. 6. Data for the A network is supplied to a modulator 36 the data being clocked into the modulator under the control of a clock. The carrier frequency employed by the A modulator 36 is 1050 Hz. Similarly data for channel B is clocked into the B modulator 38 under control of a clock. The B modulator 38 employs a 2350 Hz carrier frequency. The construction of modulators 36 and 38 is conventional and well known to those versed in the art.

When RTS of channel A goes from an OFF to ON state, modulator 36 turns ON and after a time period of 25 ms, CTS to the customer or user goes ON. Simultaneously, modulator A begins accepting data from channel A. The RTS/CTS control unit for channel B works in an identical manner.

The output of modulator 36 is passed through a low pass filter 40 to remove any high frequency components that may interfere with channel B. The output of modulator 38 is passed through a high pass filter 42 to remove any low frequency components that may interfere with channel A. The filtered outputs are then added together in adder 44 and passed through a band pass filter 46 before being fed to the telephone line. The band pass filter 46 serves to remove unwanted frequencies outside the telephone channel bandwidth.

Either one, both or neither channel may transmit at any specific instant in time. The transmission of each channel is independent of the other channel.

Figure 7:
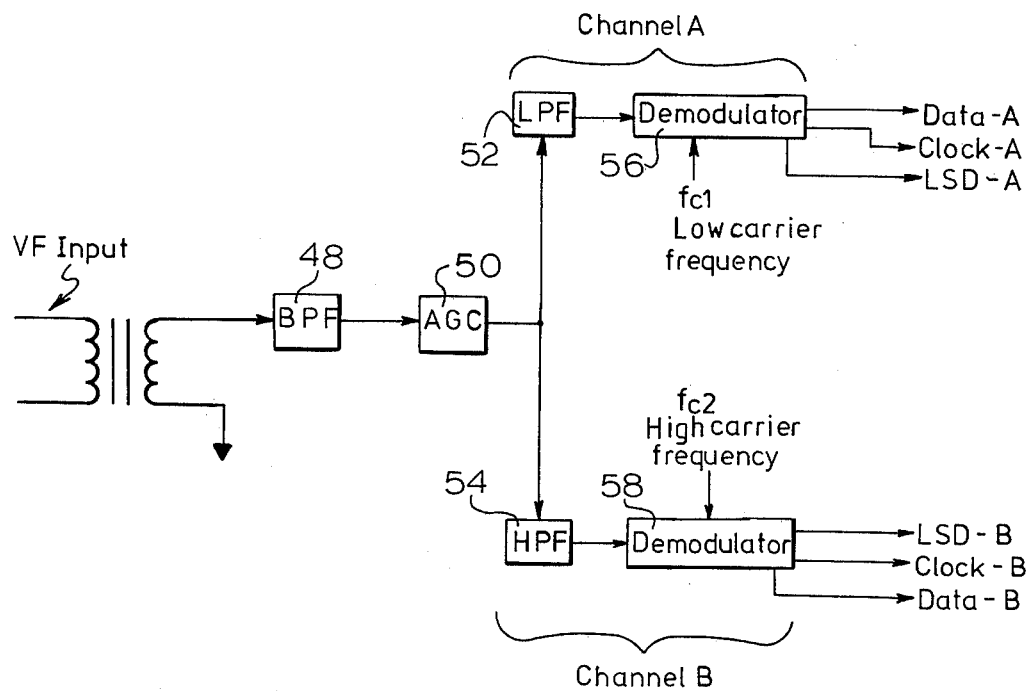
FIG. 7 is a block diagram of the modem receiver facility.

Details of the dual receiver 34 are illustrated in FIG. 7. As shown, the received signal from the telephone line 16 or communication media is fed to a band pass filter 48 to remove unwanted noise outside the bandwidth of the two channels. The BPF 48 has a nominal pass band of 400 to 3000 Hz. After filtering the composite signal is passed through an automatic gain control amplifier 50 or AGC to restore the signal level to approximately 0 dBm. The signal is then supplied to a low pass filter 52 and high pass filter 54. The low pass filter removes the channel B signal and leaves the channel A signal intact. The channel A signal which remains is fed to a demodulator 56 which recovers timing, carrier frequency and detects the channel A data. The construction of demodulator 56 is conventional and well known to those versed in the art. A nominal carrier frequency of 1050 Hz is employed by demodulator 56. Channel A clock or timing and channel A data are supplied as output to a user or the A network. Demodulator 56 also outputs a line signal detect signal (LSD) which when ON indicates to the user that the channel A modulator is ON and that valid channel A data is present. The channel A LSD signal functions independently of the fact that energy may or may not be present on channel B.

The high pass filter 54 and channel B demodulator 58 function in a similar manner except that the high pass filter removes the channel A signal and leaves the channel B signal intact.

It is apparent from the foregoing that the system appears to the A and B network users as two independent digital communication channels notwithstanding the fact that both share a common telephone line.

Having thus described the invention, what is claimed is:

1. A data communication system comprising at least two independent multipoint networks sharing common user site locations and a common communications link connecting said common user site locations, said system comprising:
 a first network terminal at each of said common site locations;
 a second network terminal at each of said common site locations;
 and a modem at each of said common site locations, each of said modems including:
 a transmitter having a first modulator connected to said first network terminal and a second modulator connected to said second network terminal;
 first high pass filter means connected to the output of one of said modulators and first low pass filter means connected to the output of the other of said modulators;
 means for combining the outputs of said first high pass and first low pass filters and feeding the combined output to said common communications link;
 a receiver having a first demodulator connected to said first network terminal and a second demodulator connected to said second network terminal; and,
 second high pass filter means interposed between said communications link and said first demodulator and second low pass filter means interposed between said communications link and said second demodulator whereby each of said modems receives and transmits data over said common communications link within a high frequency spectrum defined by said first and second high pass filter means for said first network and within a low frequency spectrum defined by said first and second low pass filter means for said second network.

2. The invention in accordance with claim 1 wherein said first and second high pass filters have the same frequency range, said first and second low pass filters have the same frequency range, and a guard band is provided between said high pass frequency range and said low pass frequency range.

* * * * *